Figure 1:
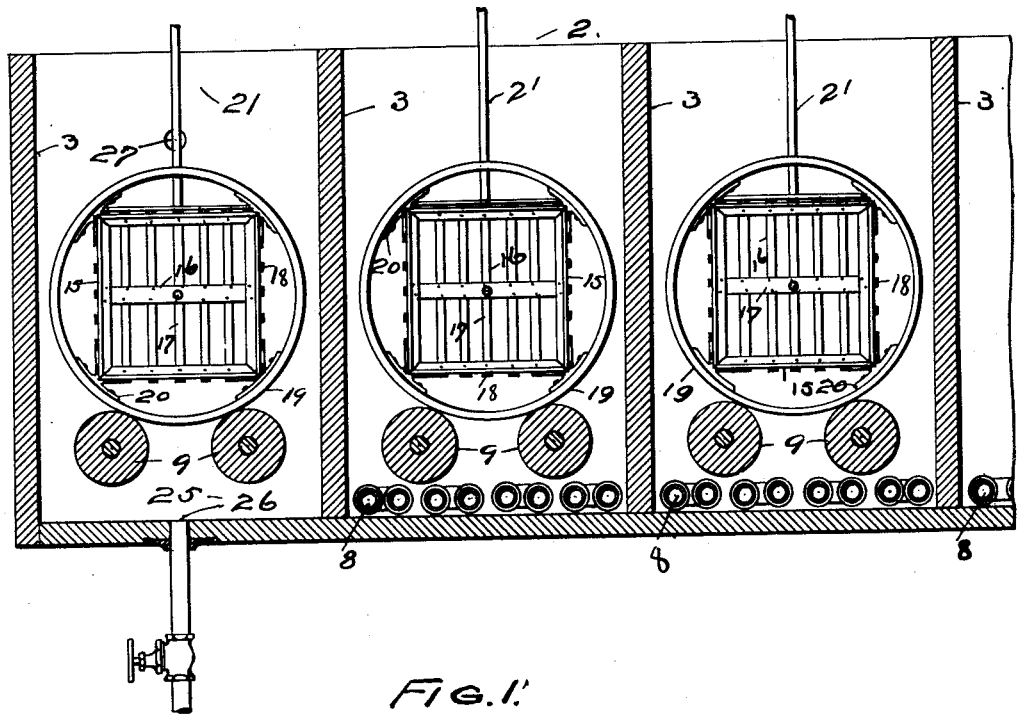

No. 829,212. PATENTED AUG. 21, 1906.
J. S. HUGHES.
APPARATUS FOR PROCESSING CANNED FOOD.
APPLICATION FILED JULY 19, 1902. RENEWED MAR. 2, 1906.

2 SHEETS—SHEET 1.

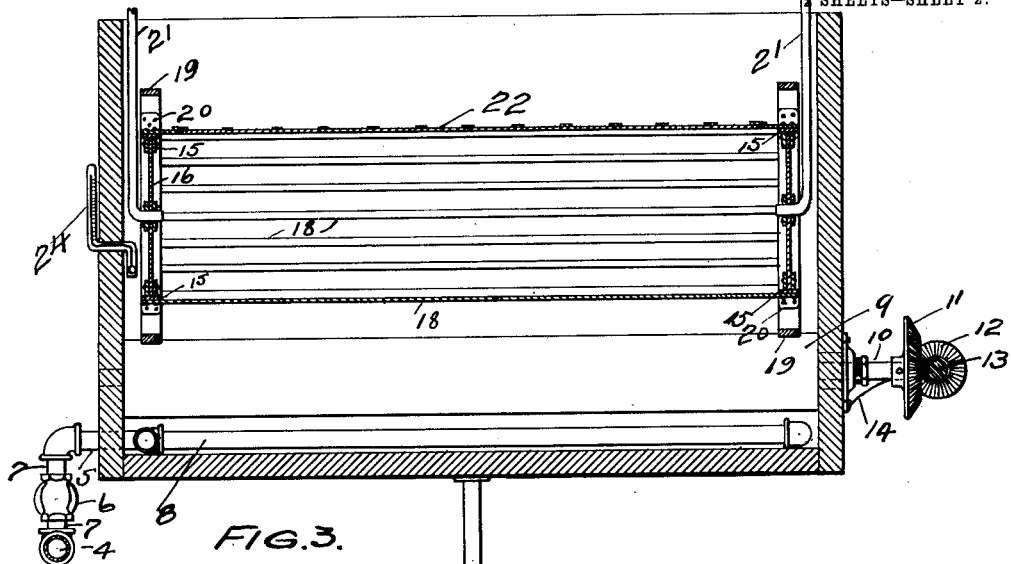
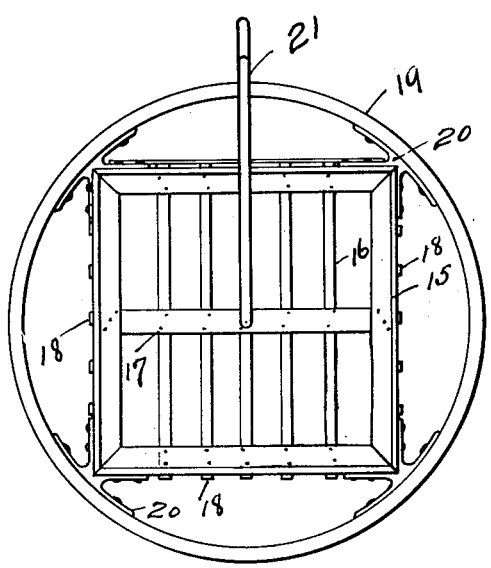
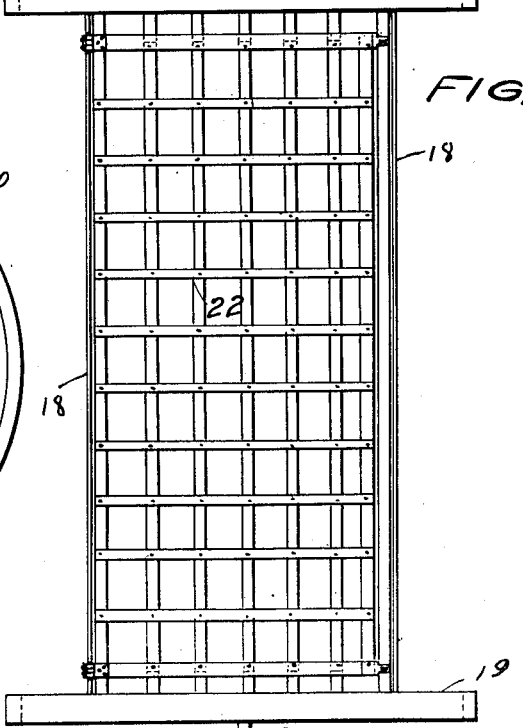

UNITED STATES PATENT OFFICE.

JOHN S. HUGHES, OF ST. FRANCIS, MINNESOTA.

APPARATUS FOR PROCESSING CANNED FOOD.

No. 829,212.   Specification of Letters Patent.   Patented Aug. 21, 1906.

Application filed July 19, 1902. Renewed March 2, 1906. Serial No. 303,795.

*To all whom it may concern:*

Be it known that I, JOHN S. HUGHES, of St. Francis, county of Anoka, State of Minnesota, have invented certain new and useful Improvements in Apparatus for Processing Canned Food, of which the following is a specification.

My invention relates to that class of apparatus designed for use in processing or cooking and cooling canned goods after the cans have been sealed.

Heretofore it has been customary where the ordinary process kettle or retort is not used to provide crates adapted to contain a quantity of filled cans and roll these crates slowly through a long tank of steam-heated chemically-prepared liquid at a temperature above boiling until the contents of the can were thoroughly cooked. The motion of the crates, it was assumed, would cause the contents of the cans to move around the sides of the cans, and thus bring the middle portion of the food out into contact with the walls of the cans, so that an equal uniform processing would be effected and decomposition and fermentation prevented. It has been found, however, that the introduction into the tank of a crate containing a large number of cold filled cans or several crates in quick succession would lower the temperature of the liquid at the receiving end of the tank below the desired degree and retard the cooking operation, and if the operator attempted to keep the temperature at that end up to the standard the liquid in the middle and at the discharge end, being stirred up and mixed with the liquid of the receiving end by the movement of the crates, would be raised above the desired degree, and there would be great danger of burning or coloring the food during the cooking operation. It has been found also that where a cylindrical crate is used and the cans dumped therein promiscuously many of them would lie lengthwise, so that when the crate was rolled the contents of some cans would follow the curved sides without being shaken up or mixed or the middle portion coming in contact with the walls, while others received an end-on-end motion, resulting in unequal cooking of the food. It has also been found that the crates enter the processing-tank at unequal intervals sometimes in very rapid succession and again more slowly. Under such conditions the difficulty of maintaining an even heat is readily apparent, and it is practically impossible to determine if all the cans have received the same heat for a sufficient length of time, and great uncertainty must exist as to evenness in quality and sterility of the product. It has also been found that the tanks and other appliances heretofore employed in cooling and rinsing the cans were cumbersome and difficult to handle and usually required an unnecessary length of time for the cooling operation.

The object, therefore, of my invention is to provide a processing apparatus which can be readily kept at the desired uniform temperature, whereby complete processing of the food under all conditions is an assured certainty.

A further object is to provide an apparatus in which each crate and its contents can be handled and treated independently of all the other crates and their contents, and thus receive the processing needed, according to the character and quality of the food.

A further object is to provide a receptacle for the cans which will permit their being packed snugly therein without any waste of space and will permit the cans to be turned endwise and the food to be thrown from one end of the can to the other and thoroughly agitated, mixed, and brought into contact with the walls, so that no portion will be uncooked.

A further object is to provide an apparatus of very simple and comparatively inexpensive construction, but strong and durable.

A further object is to effect a saving in the quantity or volume of saline solution required for the processing operation and also of the steam required to heat the solution.

A further object is to effect an immediate cooling of the cans as soon as their contents are processed. The sole purpose of processing in the canning of food is to raise the entire contents of the can to a very high temperature to kill the bacteria adhering to the food and not, as generally supposed, to improve the flavor, as in ordinary cooking. Hence it is very essential to shorten the period of heating as much as possible after the required high temperature is once reached, and the cooling apparatus becomes, therefore, a very essential part of the processing appliances.

The invention consists generally in various constructions and combinations, all as hereinafter described, and particularly pointed out in the claims.

Figure 2:
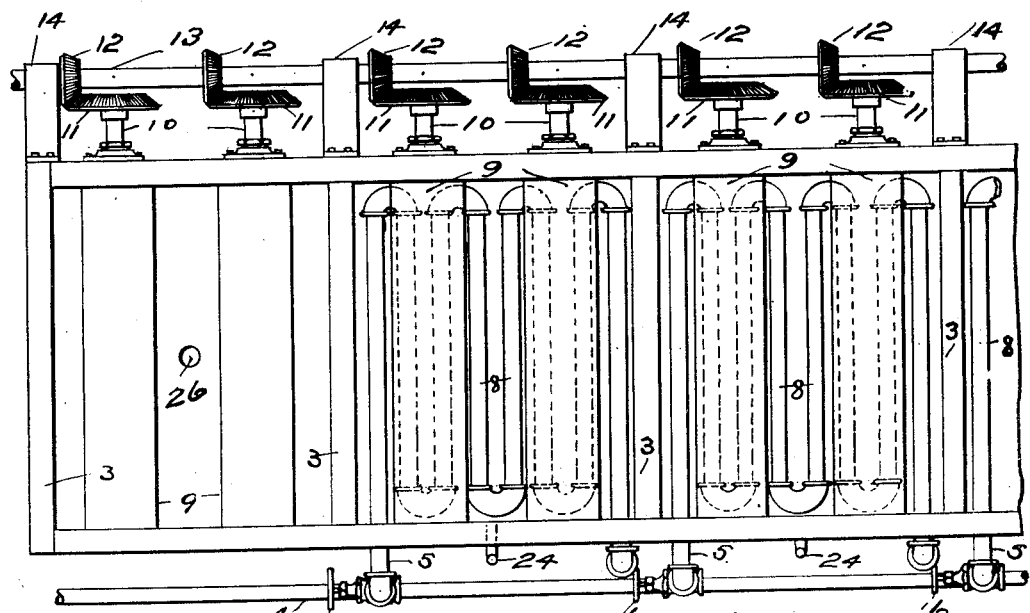

In the accompanying drawings, forming part of this specification, Figure 1 is a longitudinal section of a portion of a processing tank or apparatus embodying my invention. Fig. 2 is a plan view of the same. Fig. 3 is a transverse section on the line x x of Fig. 2. Fig. 4 is a plan view of one of the crates or receptacles wherein the cans are packed preparatory to processing. Fig. 5 is an end view of a crate.

In the drawings, 2 represents a tank constructed of plank or any other suitable material, as preferred, rectangular in form and divided into a series of processing or cooking and cooling compartments by vertical partitions 3. The tank may be of any desired length, according to the number of compartments to be made. Each compartment is open at the top and each cooking-compartment is adapted to be filled with water in which is placed a quantity of chlorid of calcium in solution or any other chemical adapted to the purpose to allow the liquid to be raised to a temperature above the boiling-point by the introduction of steam-coils therein. At one side of the tank I provide a steam-supply pipe 4, having a connection 5 opposite each compartment and a valve 6, that communicates through a nipple 7 with coils of pipe 8, arranged in the bottom of each compartment that it is desired to appropriate for use in the cooking of the food, but preferably omitted from the cooling-compartment. Within each compartment above the steam-coils I provide rolls 9, arranged in pairs and having parallel shafts 10 mounted in bearings in the sides of the tank and projecting through the wall thereof on one side and provided with beveled gears 11, meshing with similar gears 12 on a shaft 13. This shaft is supported in bearings on brackets 14 and is driven from any suitable source of power. (Not shown.) Gears of any suitable size may be provided on the shafts 10 and 13, according to the speed of the shaft 13 and the preferred number of revolutions of the rolls. I prefer to make these rolls of wood of substantially the same diameter throughout their length; but it will be understood that other material may be employed, if preferred. Each cooking-compartment, as shown, is provided with an independent valve, by means of which the steam may be admitted to or shut off from any of the coils without interfering with the coils in the other similar compartments. In this way I am able to operate all or any number of the compartments less than all, according to the volume of business and the number of cans of food to be processed. If the tank is made with a large number of compartments and the volume of business does not warrant the use of the entire tank for cooking purposes, I may shut off the steam from some of the compartments, using only a sufficient number to cook the cans of food that are ready to be treated. In this way it is only necessary to fill those compartments with the expensive solution that is to be used in cooking, and I am thus able to make a considerable saving in the cost of the liquid over the ordinary long open tank with the single compartment that is now in use for this purpose.

The receptacle wherein the filled cans are placed consists of a rectangular crate, preferably square in cross-section, having heads or ends constructed of angle-bars 15 on account of their strength and rigidity, said bars being connected at the ends by cross-slats 16 and a bracing plate or strip 17. The opposite heads are connected by bars 18, and at the ends the heads are inclosed within rings 19, that are firmly bolted to the bars 15 by means of straps 20. This forms a very strong rigid construction for the crates and renders them capable of supporting a large number of filled cans without being twisted or bent out of their proper shape, and the rings 19 resting upon the curved surfaces of the rolls and turning therewith will as the rolls are revolved cause a corresponding movement of the crate itself and its contents. A bail 21 is connected to the ends of the crate, and a hinged door or gate 22 permits access to the interior of the crate for the purpose of inserting the cans therein or removing them therefrom, and for convenience I prefer to make said gate the full length of the crate. The rectangular construction of the crate or receptacle allows the cans to be compactly placed therein end to end and extending in transverse rows from one side to the other of the crate substantially at right angles to the axis thereof, and when the crate is revolved the contents of the cans instead of following the curved side walls of the cans will be thrown from one end to the other thereof and the middle portion thoroughly mixed with that at the ends and brought into contact with the walls of the cans, where a uniform cooking is effected. The rolls turn slowly in the same direction, and the rings 19 resting thereon will be slowly revolved with the crates, keeping the food in motion, stirring the liquid, and insuring the uniform cooking of the can contents.

In the ordinary retort or kettle and in the long tanks, wherein the temperature of the liquid is constantly varying with the number of crates contained therein, it requires about an hour and twenty minutes to thoroughly sterilize the food and nearly the same time to cool it; but with my improved apparatus, where the temperature is even and the food more thoroughly stirred or agitated and uniformly exposed to the action of the liquids both in cooking and cooling, I expect to be able to reduce the time required for cooking nearly fifty per cent. less than by ordinary methods. In the end of each tank a hole is provided to receive a thermometer 24, by means of which the temperature of the liquid in the tank can be ascertained at a glance.

It is reasonable to assume that if the required heat can be most quickly obtained through agitation of the contents of the cans while cooking, so agitation will promote cooling just as surely and rapidly and more quickly than through any other method yet devised, and in order to prevent discoloration and deterioration in flavor in canned goods, notably corn, it is essential that the cans be cooled rapidly to check and abate the continuation of the cooking operation.

The apparatus which I prefer to provide for the cooling step of the processing operation is described as follows: After the crates have been revolved a sufficient length of time to allow the liquid to cook the food they are lifted out of the cooking compartments and immersed in a bath of cold water in a compartment 25 of the tank corresponding to those described, except that it has no steam-coils in the bottom and is provided with an outlet-opening 26, preferably in the bottom near the center, and overflow-openings 27, placed above the level of the top of the crate to carry away the waste water and keep the water in the compartment at a sufficiently low temperature to insure the rapid cooling of the cans and their contents and arrest the cooking operation. The crates, with their contents, are revolved on the rolls in the cooling-compartments in the same manner as described with reference to the other compartments, and as it does not take as long to cool the cans I find that it is not necessary to provide as many cooling-compartments as those equipped with the steam-coils, the proper proportion I find being about two to one.

I prefer to have the rolls in all the compartments moving continuously, so that in case it is desired to make use of one of the compartments immediately it will only be necessary to fill the same with liquid and lower the crate therein, which can all be done in a short time, and, furthermore, by having the rolls in all the compartments in motion the crates will begin to move the moment they are lowered into the liquid sufficiently to engage the rolls, for it is important during the processing operation that the cans and their contents be kept in motion, whereby burning and discoloring of the food are prevented.

I claim as my invention—

1. An apparatus for processing canned food, comprising a tank divided by vertical partitions into a series of independent cooking-compartments and containing a solution, a steam-supply pipe, coils provided in said compartments and having independent valved connections with said supply-pipe, parallel rolls mounted in bearings in said compartments, means for revolving said rolls, and a crate having a rectangular middle portion and circular ends resting upon said rolls and wherein the filled cans are placed, substantially as described.

2. The combination, with a treating-tank provided with a series of independent cooking-compartments containing a liquid and steam-coils, of revolving rolls arranged in the bottom of said compartments and crates wherein the cans are packed having rings or bearings that rest upon said rolls and are revolved thereon with said crates.

3. A crate for processing-tanks, comprising substantially square angle-bar ends having cross braces or bars and a bail, bars or rods connecting said ends and forming therewith a rectangular receptacle wherein filled cans may be compactly packed crosswise of the crate, a gate provided in the side of said crate, and rings inclosing the ends thereof and rigidly secured to said angle-bars at the corners of the crate, substantially as described.

4. The combination, with a tank provided with cooling and cooking compartments having open tops, of revolving rolls arranged near the bottom of said compartments, steam-coils provided beneath said rolls in said cooking-compartments only, outlets and overflow-pipes for said cooling-compartments, and rectangular crates wherein the filled cans are packed and rings inclosing the ends of said crates and secured thereto and adapted to rest upon said rolls and be revolved thereby, substantially as described.

5. An apparatus for processing canned food comprising a tank divided by vertical partitions into a series of cooking and cooling compartments, the former containing a chemical solution and the latter a supply of cold water, steam-coils provided in the bottom of said cooking-compartments only, revolving rolls arranged in both said cooking and cooling compartments, crates adapted to contain a quantity of cans and having bearings on said rolls to revolve therewith, and said compartments having open tops and said crates having means to facilitate their removal from a cooking to a cooling compartment, substantially as described.

In witness whereof I have hereunto set my hand this 8th day of July, 1902.

JOHN S. HUGHES.

In presence of—
 WM. STREETLY,
 C. STREETLY, Jr.